United States Patent [19]

Ammann et al.

[11] 3,857,699

[45] Dec. 31, 1974

[54] PROCESS FOR RECOVERING NON-FERROUS METAL VALUES FROM REVERBERATORY FURNACE SLAGS

[75] Inventors: Paul R. Ammann, Reading; Jang Ho Kim, Chelmsford; Michael J. Redman, Belmont, all of Mass.

[73] Assignee: Kennecott Copper Corporation, New York, N.Y.

[22] Filed: Mar. 5, 1973

[21] Appl. No.: 338,197

[52] U.S. Cl.............................. 75/24, 75/63, 75/89, 75/107, 75/109, 75/121
[51] Int. Cl............................................. C21b 3/04
[58] Field of Search............. 75/24, 63, 84, 89, 101, 75/107, 109, 121, 108

[56] References Cited
UNITED STATES PATENTS

| | | | |
|---|---|---|---|
| 3,146,093 | 8/1964 | Foos et al. | 75/84 |
| 3,196,004 | 7/1965 | Kunda | 75/84 |
| 3,273,997 | 9/1966 | Wilson | 75/108 |
| 3,314,783 | 4/1967 | Zimmerley et al. | 75/84 |
| 3,455,677 | 7/1969 | Litz | 75/109 |

*Primary Examiner*—Walter R. Satterfield
*Attorney, Agent, or Firm*—Kenway & Jenney

[57] ABSTRACT

The process includes selectively extracting metal values such as molybdenum and copper from ferrosilicate slags containing less than 5 percent by weight magnetite ($Fe_3O_4$) into a molten immiscible metal sulfide matte. After the matte-slag extraction step, the metal bearing matte is oxidized. Thereafter, the oxidized matte is leached to dissolve the metal values. The metal bearing leach liquor is then subjected to solvent extraction or precipitation to produce the desired metal product. The metal sulfide matte contains iron and sulfur in a mole ratio of about two to one to nine to one with a matte containing a mole ratio of iron to sulfur of about two to one to three to one being preferred. The temperature of the system during the matte-slag extraction step is maintained between the range of temperatures of the slag melting point (about 1050°C.) and 1600°C. The preferred temperature range for the system is between 1200°C. to 1375°C.

16 Claims, 9 Drawing Figures

PROCESS FOR RECOVERING NON-FERROUS METAL VALUES FROM REVERBERATORY FURNACE SLAGS

BACKGROUND OF THE INVENTION

The present process is directed toward the selective recovery of non-ferrous metal values from reverberatory furnace slags, particularly for recovering molybdenum and copper values from copper reverberatory furnace slags. Slag obtained from the reverberatory smelting of copper concentrate may contain a sufficiently high molybdenum concentration to provide an economic incentive for its recovery. Generally, the molybdenum present in the slag is due to inefficiencies in the flotation step for separating molybdenite from copper sulfide minerals prior to the smelting step. Analysis of typical copper reverberatory slags shows that the molybdenum is dispersed throughout the glassy iron silicate phase. Other copper slags such as copper converter slags also contain molybdenum bound in an iron silicate phase although at concentrations lower than those in copper reverberatory slags. While the present invention is particularly adapted for use with copper reverberatory slag because of its relatively high molybdenum content, it is to be understood that other slags such as steel slags or copper smelter slags containing molybdenum or other non-ferrous metals in an iron silicate phase also can be processed according to this invention. Typical leaching processes cannot be used to recover and isolate the metal values in these slags because the iron silicate is inert to dilute acids and caustic solutions. Concentrated caustics and acids will dissolve the slag with an uneconomical consumption of reagent.

For molybdenum and copper recovery, the process includes the following four steps:

1. extraction of the metal values in the slag into a molten, immiscible metal sulfide matte;
2. treating the matte by oxidation at a high temperature to yield an oxide;
3. leaching the calcine (oxide) with an acid or a base to dissolve the metal values; and
4. producing a molybdenum or copper product by solvent extraction or precipitation of the metal bearing leach liquor.

The most significant difference between the process of the present invention and the known prior art is found in the matte-slag extraction step (step (1) above), although there are minor differences between steps (2) and (3) and the known prior art processes. In this regard, various processes are known wherein metal values are oxidized and leached and then treated by solvent extraction or precipitation. Indeed, U.S. Pat. No. 3,314,783 to Zimmerley et al. discloses such a process. In the Zimmerley et al. process, however, the molybdenum in ferrosilicate slags is reduced preferentially to the iron in the slag and is collected by the concentrated in a metallic reduction product. Minor additions of sulfur are included in the reaction system to produce a brittle metallic sulfide matrix for fine metallic particles.

Although the process disclosed in the Zimmerley et al. patent represents a significant breakthrough in this art, that process is not as economical as the process of the present invention, particularly for slags containing very low concentrations of molybdenum or copper. In addition, the Zimmerley et al. process, like most pyrometallurgical processes, is conducted in a single stage reactor.

By following the process of the present invention, however, products with a high concentration of metals (copper and molybdenum for example) can be obtained from slags initially containing very low concentrations of these metals, while also achieving high recoveries economically. Furthermore, the process of the present invention can be performed in a multistage operation as well as a single stage reaction vessel.

The major advantages of the present process over the known prior art processes include improved economics which result from lower energy consumptions, the fact that smaller furnaces can be utilized and a less expensive acid leach procedure.

Accordingly, it is an object of the present invention to provide a process for recovering molybdenum and copper values from non-ferrous smelting furnace slags wherein metal values in the slag are extracted into a metal sulfide matte containing iron and sulfur in an iron to sulfur mole ratio of nine to one to two to one.

A further object of the present invention is to provide a process for the recovery of metal values from non-ferrous smelting furnace slags wherein the process is performed in a multistage countercurrent system.

Yet another object of the present invention is to provide a process for recovering molybdenum and copper values from furnace slags wherein a furance slag is contacted with an iron sulfide matte in a counter current manner to extract values from the slag into the matte.

Yet another object of the present invention is to provide a process for recovering non-ferrous metal values, such as molybdenum and copper, from furnace slags that is more economical than known prior art processes.

SUMMARY OF THE INVENTION

These and other objects of the invention are accomplished by a process wherein non-ferrous metal values are extracted from ferruginous slags. The extraction may be conducted in a multi-stage countercurrent furnace reactor. In the reactor, a sulfide matte containing between 10-30 percent by weight of sulfur is employed to extract the metal values from the slag. The process produces a low melting iron sulfur product, the composition of which is controlled by the composition of the slag. The low melting product can contain metal values such as molybdenum, copper, zinc, cobalt, nickel and gold if these values are present in the starting slag.

DESCRIPTION OF THE PREFERRED EMBODIMENTS

At the outset, the process of the present invention is described in its broadest overall aspects with a more detailed description following. The present invention pertains to the pyrometallurgical treatment of molten smelter slags to extract and recover metal values, such as molybdenum and copper. The process may be used for the pyrometallurgical treatment of reverberatory furnace and converter slags. More than one stage may be used, with countercurrent flow of the slag and immiscible product phases between the stages to effect both high extractions from the slag phase and high concentrations of metals in the products.

Figure 1:
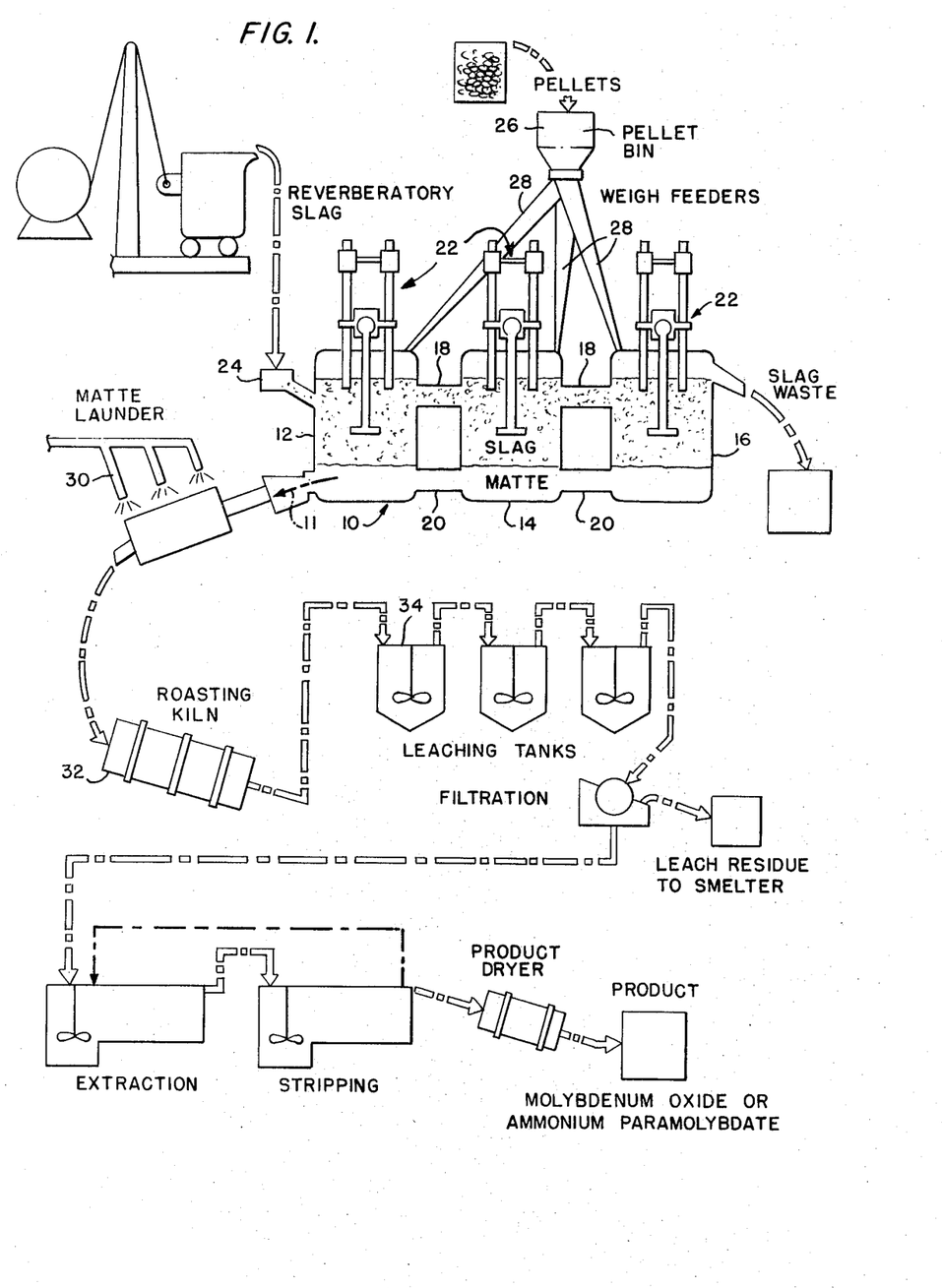
FIG. 1 is a diagrammatic representation of a process for recovering molybdenum from ferruginous slags illustrating the various equipment that is employed in processes such as the process of the present invention.
Figure 2:
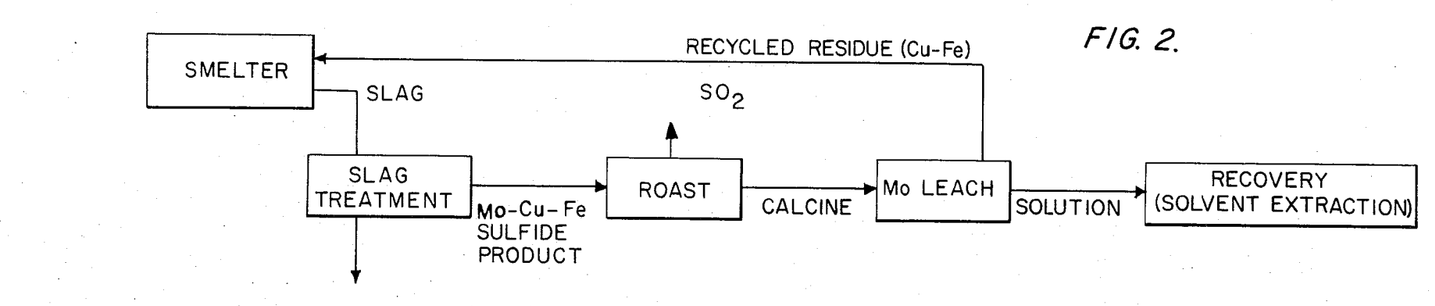
FIG. 2 is a block diagram of a slag treatment process for recovering molybdenum and copper.

The present process is an improvement in the process appearing in U.S. Pat. No. 3,314,783, S. R. Zimmerley et al, entitled, "Process for the Recovery of Molybdenum Values from Ferruginous, Molybdenum-Bearing Slags," the teachings of which are incorporated herein by reference. As is shown in FIGS. 1 and 2, the process of the present invention includes four principal steps which are:

1. slag treatment,
2. roasting,
3. leaching, and
4. metal recovery.

The most significant deviation of the present process from the process of the Zimmerley et al patent occurs in the slag treatment step. In accordance with the present invention, the recovery of molybdenum, copper and other non-ferrous metal values present in the slag to be treated is based upon the extraction of these metal values into a molten iron sulfide product which is subsequently processed by roasting, leaching and metal recovery. By way of example, when conventional copper reverberatory slag is treated in accordance with the present invention, in the slag treatment step, the molybdenum, which is present in the slag treatment step, the molybdenum, which is present in the slag at a typical concentration ranging from 0.1 to 1.6 percent by weight, is extracted from the slag into a product with a high concentration of molybdenum. The foregoing is accomplished by contacting the molten slag with a molten iron-sulfide matte into which molybdenum is preferentially transferred from the slag. The transfer may be accomplished in a multistage furnace reactor or a single stage reactor. These points are amplified in greater detail below. At this point it should be noted that all percentages appearing in this specification and claims are weight percentages, unless otherwise specified.

The crux of the present process involves the utilization of an iron-sulfide matte containing iron and sulfur within a particular concentration range and with the molten slag being contacted under specific temperature conditions. Thus, in accordance with the present invention, temperature and matte concentration ranges are disclosed at which molybdenum is soluble in an iron-sulfur matte in preference to the slag.

To obtain relatively high distribution coefficients, the iron to sulfur mole ratio in the matte is maintained between about two to one to nine to one with a matte containing a mole ratio of iron to sulfur of about two to one to three to one being preferred, and the temperature is maintained between the range of temperatures of the slag melting point (about 1050°C.) and 1600°C. The preferred temperature range for the system is between 1200°C to 1375°C. In connection with the foregoing, the distribution coefficient of molybdenum is defined as the ratio of molybdenum concentration in the matte to the molybdenum concentration in the slag in a single stage.

To obtain a relatively high iron to sulfur mole ratio, the matte is formed by melting pyrrhotite (FeS) and converting a portion of the iron oxide (FeO) in the molten slag to iron (Fe) by the addition of a reducing agent such as carbon. This method of obtaining the high iron to sulfur mole ratio is preferable to adding iron to the matte since the addition of iron is economically less attractive.

The slag treatment product can contain molybdenum, copper and other non-ferrous metal values in an iron sulfide, and these values must be separated and recovered. The slag treatment product is drawn off separately from the slag. This product is preferably cooled rapidly, as by water quenching, to place it in granulated or other finely-divided condition for subsequent treatment. As a metallurgical product in and of itself, it constitutes a concentrate from which the molybdenum values, as well as other non-ferrous metal values, can be extracted. The cooled sulfide is oxidized in a roaster to remove sulfur and form oxides of iron and non-ferrous metal values, such as copper and molybdenum, the latter as molybdates.

The molybdenum is recovered from the calcine. In the leaching step, the molybdenum is put into either a basic or acidic solution. Depending on conditions, copper may be leached (acid system) and chemically recovered or not leached and returned to the smelter in the residue.

In the final step, the molybdenum is purified and recovered from the leach solution. This may be accomplished by solvent extraction or precipitation.

The present process is intended to be used in order to recover metal values from slag as slag is discharged from furnaces. Thus, when the present process is employed, it does not necessitate a change in the operation of a smelter. In fact, the process may be operated in a plant which is separated from the smelter and to which molten slag is delivered by train, trucks or cranes. When the metal values are removed, the slag waste is discarded in accordance with conventional procedures. It should be noted, however, that the slag treatment process of the present invention can be an adjunct to a reverberatory furnace and operated within the smelter itself. A system of this type has cost saving advantages in that equipment as well as labor costs are lower.

The following model indicates various process parameters for a plant designed to treat 2,000 tons per day of molten slag from three reverberatory furnaces, each producing approximately 670 tons of ferruginous slag per day. Slag from each reverberatory furnace is skimmed 2 to 3 times per shift producing about 80 to 110 tons of slag in each skim. The average composition of the slag is set forth in Table 1 below.

TABLE 1

| Constituent | (Percent by Weight) |
|---|---|
| $Fe_2SiO_4$ or $2FeO \cdot SiO_2$ | 57.72 |
| $Fe_3O_4$ | 5.0 |
| $SiO_2$ | 5.0 |
| $CaSiO_3$ | 16.0 |
| $MgSiO_3$ | 5.00 |
| $Al_2O_3 \cdot SiO_2$ | 8.00 |
| Cu | 0.50 |
| Mo | 0.30 |
| FeS | 0.64 |
| impurities | balance |

The molten slag is collected in a slag pot car underneath the reverb building, and hauled by train to the slag treatment plant. The average rate of slag delivery to the slag treatment plant is 83 tons per hour; however, a plant can easily be designed for a peak feed rate of 50 percent higher, or 125 tons per hour.

To allow for operating flexibility, the plant is designed with two parallel units, each designed for 66 tons per hour of feed. Experimental rate data shows that the molybdenum is extracted from the slag phase into the matte, and equilibrium is reached in 20 minutes. This rate is achieved with an interfacial area between the matte and slag (in a quiescent state) of approximately 8 ft²/ton of slag.

Figures 3, 4:
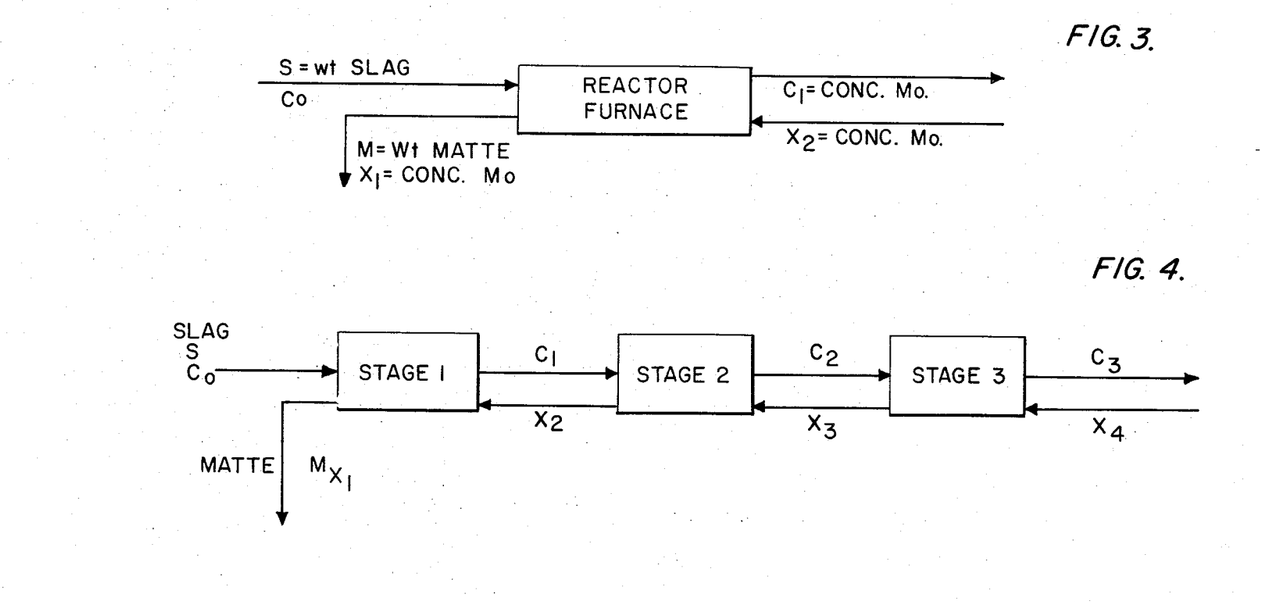
FIG. 3 is a diagram showing a single stage system in accordance with the present invention.
FIG. 4 is a diagram showing a three-stage system in accordance with the present invention.

The extraction of molybdenum from molten slag in accordance with the present invention can be compared by analogy to a solvent extraction system. Two phases, molten slag and a molten reduction product (or matte) are brought into contact and the molybdenum transfers from the slag phase into the product phase. Theoretically, this transfer takes place until a thermodynamic equilibrium is reached which is defined as a distribution coefficient D.

$$D = X_{Mo}/C_{Mo}$$

where $X_{Mo}$ = weight percent of molybdenum in matte
$C_{Mo}$ = weight percent of molybdenum in slag In an equilibrium stage reactor, the products are in thermodynamic equilibrium, and the system is described by material balance and the distribution coefficient. It is assumed that there are no changes in quantity of composition of any phases or components other than molybdenum. The system is shown diagrammatically in FIG. 3 where:

S = weight of slag
M = weight of matte
$C_o$ = initial concentration of molybdenum, wt. Mo/wt. slag
$C_1$ = concentration of molybdenum in treated slag, wt. Mo/wt. slag
$X_1$ = concentration of molybdenum in product, wt. Mo/wt.slag
$X_2$ = concentration of molybdenum in feed, wt. Mo/wt. slag By equilibrium $$D = X_1/C_1 \quad (2)$$

and by material balance, $$S(C_o - C_1) = (X_1 - X_2) \quad (3)$$

the yield is $$(C_o - C_1/C_o) = M(X_1 - X_2)/S C_o \quad (4)$$

and if $X_1 = D C_1$, then $$(C_o - C_1)/C_o = MX_1/S C_o = MDC_1/S C_o \quad (5)$$

or the yield is $$(C_o - C_1)/C_o = 1/[1 + S/MD] \quad (6)$$

and the product concentration is defined by $$X_1 = S/M \, C_o/[1 + S/MD] \quad (7)$$

The product concentration is related to the ratio of slag to matte, the initial concentration and the distribution.

As an example, let the yield be 0.9 (90%), the initial slag concentration be 0.003, and distribution coefficient be 50. From equation (6), $$0.9 = 1/1 + S/M \cdot 50$$

$$S/M = 5.56$$

and the product concentration is $$X_1 = (5.56)(0.003)/[1 + (5.56/50)] = 0.015 \text{ or } (1.5\%)$$

For a given distribution coefficient, a single stage reactor produces a low concentration of product to achieve a high recovery, or sacrifices yield to obtain a high concentration product. In other words, a single stage does not provide adequate process flexibility. Consequently, a multiple stage, countercurrent reactor system is preferred.

Through a series of analyses based on operating flexibility, operability, energy losses and costs, a three-stage system was selected for the slag extraction process. This system is shown diagrammatically in FIGS. 1 and 4.

The product composition $X_1$ and the yield are related to the process conditions in equations (8) and (9).

$$X_1 = \frac{\frac{S}{M} \cdot C_o \cdot \left\{\left(1+\frac{S}{MD}\right)^2 - \frac{S}{MD}\right\}}{\left\{\left(1+\frac{S}{MD}\right)^3 - 2\left(\frac{S}{MD}\right)\left(1+\frac{S}{MD}\right)\right\}} \quad (8)$$

$$\text{Yield} = \frac{C_o - C_3}{C_o} = \frac{\left(1+\frac{S}{MD}\right)^2 - \frac{S}{MD}}{\left(1+\frac{S}{MD}\right)^3 - 2\left(\frac{S}{MD}\right)\left(1+\frac{S}{MD}\right)} \quad (9)$$

Figure 5:
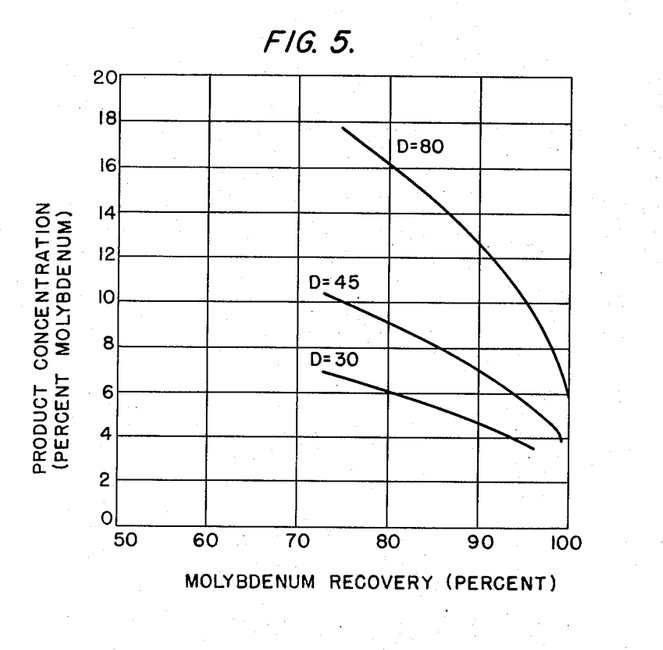
FIG. 5 is a graph showing product concentration as a function of molybdenum recovery and distribution coefficient for a three-stage countercurrent flow reactor system for a slag with an initial molybdenum concentration of 0.3 percent by weight.
Figure 6:
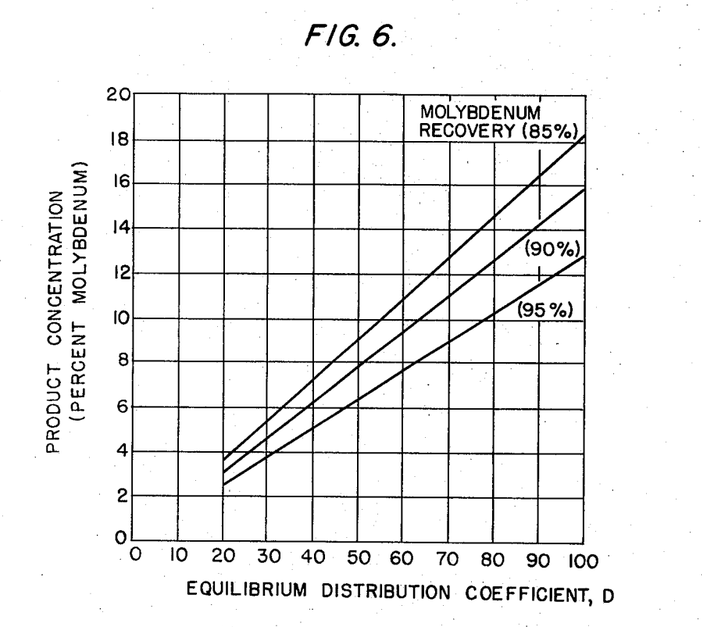
FIG. 6 is a graph showing the product concentration as a function of distribution coefficient and molybdenum recovery for a three-stage countercurrent reactor system.

From these equations, the yield and product composition were computed as a function of the distribution coefficient and the ratio of slag to matte. The calculations are presented in FIG. 5 as production concentration as a function of the overall molybdenum recovery for distribution coefficients of 30, 45 and 80. In FIG. 6, the product concentration is plotted versus the distribution coefficient. All the data is calculated for an initial slag composition of 0.3 percent by weight of molybdenum.

The embodiment of the present invention wherein slag and a matte contact each other in a countercurrent manner is best shown in FIG. 1. To accomplish such countercurrent contact, a multistage reactor 10 is used. Although three reactors 12, 14 and 16 are shown in FIG. 1, as is apparent, two reactors can be utilized, or, indeed, more than three reactors can be utilized. reactors 12, 14 and 16 are connected in series by upper and lower conduits 18 and 20. As is shown in FIG. 1, lower conduits 20 allow a flow of matte from one reactor to another whereas upper conduits 18 allow a flow of slag from one reactor to another. It is preferrable to stir the contents of the reactor with a stirrer assembly 22. Stirrer assembly 22 may be of the type referred to in Example 1 below; that is, a water cooled mechanical stirrer having copper blades.

Reverberatory slag is introduced into slag treatment reactor 10 by being poured into a launder 24 located on reactor 12. Other constituents in reactor 10, such as iron pyrites, iron and sulfur, are added to reactor 10 by means of a feed bin 26 which has launders 28 which distribute materials to reactors 12, 14 and 16. The three slag treatment reactors 12, 14 and 16 connected in series were determined to provide high molybdenum yields and overall process flexibility. To handle 66 tons per hour based on slag feed rates, each unit 12, 14 and 16 must be able to contain 22 tons of slag. Each reactor 12, 14 and 16 holds a maximum of 15 tons of matte product. The matte is generated continuously in each furnace, and once each shift, the matte is tapped off from first reactor 12 into which the slag is fed. Only half of the matte is tapped at any one time. The quiescent interfacial area between slag and matte is [

$$(\pi/4) (7.5 \text{ ft})^2/22 \text{ tons} = 2 \text{ ft}^2/\text{ton slag},$$

but mechanical agitation of the slag will increase the effective interfacial area.

As is set forth above, the slag treatment product can contain molybdenum, copper and other non-ferrous metal values. To recover these values, the slag treatment product, represented by arrow 11, is drawn off separately from the slag. The product is then preferably cooled by spraying it with water as is shown by sprayers 30 to place it in a finely-divided state for subsequent treatment. The cooled, granulated sulfide product is then oxidized in a roaster 32 to remove the sulfur and form oxides of the metal values. A calcine is produced in the roaster 32 from which the metal values are recovered.

In a leaching step, molybdenum is put into either a basic or an acidic solution in leaching tanks 34. After filtration, the molybdenum is passed along in the leach solution from which it is purified and recovered. The leach residue which contains copper can be returned to the smelter.

As is set forth above, the process of the present invention is similar to the prior art process as set forth in U.S. Pat. No. 3,314,783 to Zimmerley and Beck. A significant difference between the present process and the Zimmerley and Beck process is found in the manner of extracting metal values in the slag into a molten, immiscible metal sulfide matte. These differences occur within reactor 10 and include different concentrations of matte and different temperature ranges. Furthermore, the extraction step of Zimmerley and Beck is not accomplished in a countercurrent manner in a multistage reactor. Thus, as is shown in FIG. 1, three furnaces or reactors agitated by a stirrer assembly 22 are operated with a countercurrent flow of molten slag and molten extraction phase. The temperature of the system of the present invention is preferably maintained between 1200° – 1300°C. due to the low melting sulfide product. The typical temperature of the system is 1250°C. As is explained below, however, the operating temperature is determined by the composition of the matte.

A typical composition for the sulfide matte is as follows:

| | |
|---|---|
| Fe | 65-70 |
| Mo | 6-16 |
| Cu | 6-10 |
| S | 24-30 |
| Fe/S | 2-3 |

In the process of the present invention, the slag treatment product can be subjected to an acid preleach to dissolve some of the iron content. As is well known in this art, sulfuric acid is normally employed in such preleaching. Preleaching would be accomplished prior to roasting in roaster 32.

A variation in the roasting step in accordance with the present invention, as compared to the process of Zimmerley and Beck, is that in the present process, the solids are roasted or oxidized at 800°C. to remove 95 percent of the sulfur and produce an oxide calcine.

In the leaching step, the calcine may be leached in an acid as well as a base. When the calcine is leached in an acid, 85–95 percent of the molybdenum is solubilized in sulfuric acid along with up to 80 percent of the copper and about 5 percent of the iron. When the calcine is leached in a base (NaOH) such as is disclosed in the Zimmerley and Beck patent, 75 percent of the molybdenum is leached in a 2 hour leaching period with negligible copper and iron being solubilized.

In the metal recovery or purification step, molybdenum can be extracted from an aqueous solution by solvent extraction and recovered as $(NH_4)_2MoO_4$. It should be noted that the purification disclosed in Zimmerley and Beck can also be used, in which case molybdenum is removed from $Na_2MoO_4$ solution by precipitation. $Na_2MoO_4$ is the result of a sodium hydroxide leach.

The present invention is further illustrated by the following non-limiting examples given for three steps in the process: (1) extraction of molybdenum and copper from molten slags, (2) roasting an Mo-Cu iron sulfide matte, and (3) leaching Mo-Cu from roaster calcine.

Example 1

A charge of 250 pounds of copper reverberatory furnace slag was remelted in a furnace which was heated by radiation from silicon carbide Globar heating elements. The approximate composition of the slag is given in Table 2 below.

TABLE 2

| Component | Composition (Weight Percent) |
|---|---|
| FeO | 46.5 |
| $Fe_3O_4$ | ~5 |
| $SiO_2$ | 41.0 |
| $Al_2O_3$ | 3.72 |
| CaO | 2.18 |
| Cu | 0.48 |
| Mo | 0.33 |
| impurities | balance |

The slag was molten at approximately 1050°C. A water-cooled mechanical stirrer, consisting of three, equally-spaced copper blades, 3 inches long by 2 inches wide was lowered into the molten slag. The water-cooled stirrer which was used is disclosed in a U.S. Pat. application, entitled "Pyrometallurgical System with Fluid Cooled Stirrer," by Paul R. Ammann et al. Ser. No. 338,328 filed on Mar. 5, 1973, the teachings of which are incorporated herein by reference. A solid coating of slag forms on the blades and shaft immediately upon contact with the molten slag. The blades were located approximately 8 inches below the surface of the melt, which was 12 inches deep. The rotation of the stirrer could be varied between 0 and 350 RPM. The temperature of the slag was maintained between 1200° and 1250°C during treatment.

With the slag being stirred at a slow speed (10 RPM), 5 pounds of pyrite ($FeS_2$) and 3.8 pounds of coke, in the form of composite pellets was charged to the furnace and melted to produce an Fe—S matte. The coke was used to reduce FeO in the slag to iron and enrich the FeS matte in iron. The molybdenum and copper concentrations of the slag were measured as a function of time without stirring, as shown in Table 3 below.

TABLE 3

| Time (minutes) | Mo (Weight Percent) | Cu (Weight Percent) |
|---|---|---|
| 0 | 0.33 | 0.48 |
| 20 | 0.325 | (0.551) |
| 30 | 0.335 | 0.45 |
| 40 | 0.323 | 0.45 |
| 50 | 0.322 | 0.47 |
| 60 | 0.333 | 0.48 |
| 70 | 0.283 | 0.423 |
| 80 | 0.307 | 0.423 |

The matte product which ultimately contained the extracted molybdenum and copper had the composition set forth in Table 4 below.

TABLE 4

| Component | Concentration (Weight Percent) |
|---|---|
| Mo | 5.26 |
| Cu | 6.35 |
| Fe | 58.2 |
| S | 17.6 |
| Slag | 12.6 |
| Total | 100 |

Allowing for the iron in the slag, the matte had a ratio of iron to sulfur of:

$$[(58.2) - (0.395)(12.6)]/(17.6) = 3.0.$$

This represents an iron-rich matte as compared to FeS(Fe/S = 1.75). The results show that negligible extraction of molybdenum and copper occurred in 80 minutes without stirring even though the composition of matte was favorable for extraction of the molybdenum and copper. It was concluded that the poor rates of molybdenum and copper extraction were due to poor contact between the slag and FeS matte.

EXAMPLE 2

To demonstrate the effect of mechanical stirring, Example 1 was repeated. A charge of 250 pounds of slag was remelted in the same furnace. A small quantity of $Na_2MoO_4$ was added to the slag to adjust the molybdenum concentration. The melt was stirred at 300 RPM for 10 minutes and a sample withdrawn. The concentrations of molybdenum and copper were 0.365 weight percent and 0.462 weight percent, respectively. Ten pounds of pyrite concentrate ($FeS_2$) was charged to the furnace to produce an iron sulfide matte. Three pounds of charcoal briquets were placed on top of the melt to maintain a reducing furnace atmosphere. The system was stirred for 25 minutes and slag samples taken to follow the molybdenum and copper extractions. Between 25 and 55 minutes of the experiment, there was no extraction of molybdenum into the FeS matte. Six pounds of nails were added between 55 and 70 minutes to enrich the iron in the matte. Because of the time required to heat and melt the iron nails, it is estimated that the iron-rich matte was formed at 85 minutes of the run. Then the molybdenum was extracted rapidly during the next 20 minutes from 0.32 percent to 0.16 percent. This was $$(0.32 - 0.16/0.32 - 0.11) \times 100 = 76\% \text{ of maximum.}$$

From the results appearing in Table 5 below, it was concluded that in the mechanically stirred furnace, with an iron-rich matte, rapid extractions of molybdenum can be achieved.

TABLE 5

| Time | Mo (Wt. Percent) | Cu (Wt. Percent) | Stirring (RPM) | Matte |
|---|---|---|---|---|
| 0 | 0.36 | 0.48 | 300 | None |
| 10 | 0.365 | 0.46 | 300 | None |
| 25 | 0.368 | 0.49 | 280 | $FeS_2$ |
| 45 | 0.376 | 0.50 | 280 | $FeS_2$ |
| 55 | 0.383 | 0.51 | 280 | $FeS_2$ |
| 75 | 0.366 | 0.40 | 280 | Nails added |
| 85 | 0.32 | 0.43 | 280 | Nails Melted |
| 95 | 0.28 | 0.42 | 280 | Fe-Fe/S Matte |
| 105 | 0.16 | 0.35 | 280 | FeFe/S Matte |
| 120 | 0.11 | 0.29 | 0 | Fe-Fe/S Matte |

EXAMPLE 3

To evaluate the significant process variables in the extraction of metals from slag, a number of experiments were run. The major variables considered were: (1) rate of stirring, (2) weight ratio of molten matte to molten slag, and (3) the iron to sulfur ratio in the matte.

Figure 7:
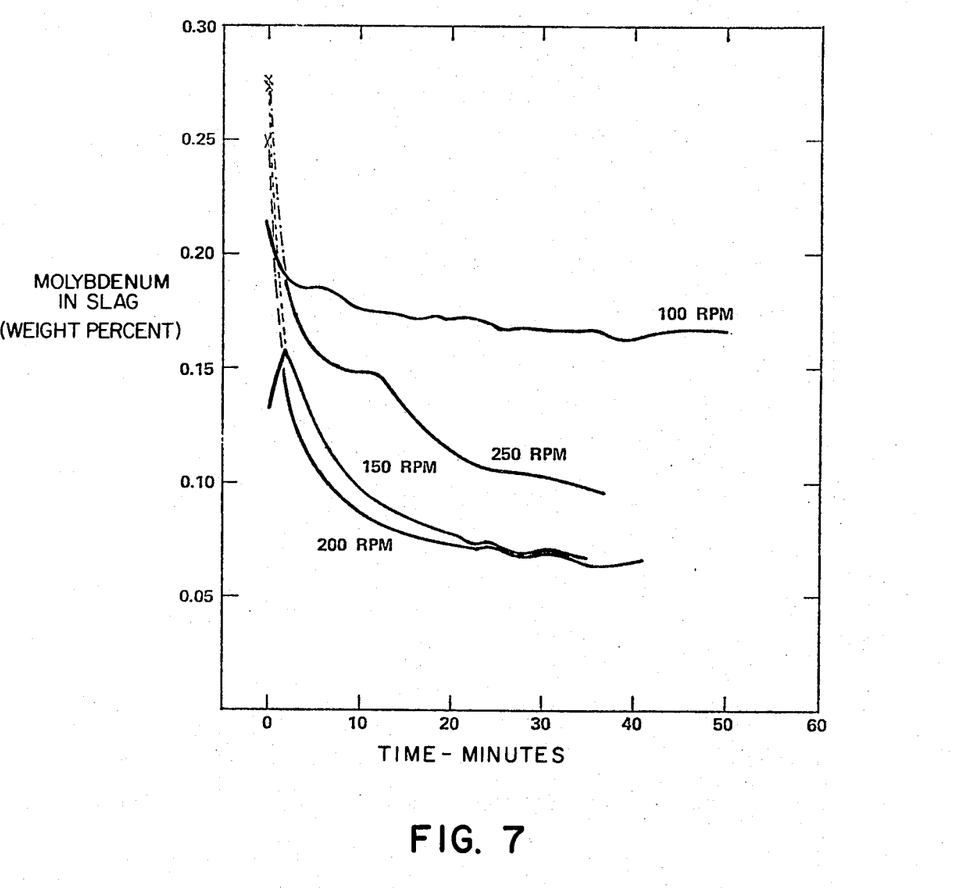
FIG. 7 is a graph showing the effects of stirrer speed on molybdenum extraction.

The effect of stirring on molybdenum extraction rate was measured in the range of 100 to 250 RPM. The measured rates of extraction are shown in FIG. 7. At 100 RPM, the extraction rate is very slow. Lower extraction rates occur at stirring speeds of less than 100 RPM. The rates of extraction are significantly higher at 150 and 200 RPM, but at 250 RPM and above, the "apparent" extraction rate is lower than at the lower speeds. This effect is caused by the dispersion of fine droplets of matte in the slag at very high stirring speeds, and because these drops do not separate from the slag rapidly, it appears that molybdenum has not been extracted from the slag. Thus, there is an optimum stirring rate which provides both rapid extraction and separation of the matte from the slag phases. Each system has its own optimum conditions, depending upon geometry of stirrers and slag bath.

The weight ratio of molten matte to molten slag is important since it affects the interfacial contact between the two phases. At 100 RPM, data shows significantly faster extraction rates with a matte-to-slag ratio of 60/250 as compared to a ratio of 30/250. At 150 RPM, the initial rate of molybdenum extraction is higher at the larger ratio of matte to slag, but the overall metal extractions are comparable after 20 minutes. Thus, the ratio of matte to slag is important, particularly at slower stirring speeds.

Finally, the composition of the matte; namely, the ratio of iron-to-sulfur, effects the distribution of molybdenum between the matte and slag and hence the driving force (or chemical potential) for extraction. It also affects the degree of completion of the extraction.

EXAMPLE 4

To demonstrate a three-stage countercurrent furnace reactor of the type shown in FIG. 1, the first and third stages of a three-stage unit were simulated.

Figure 8:
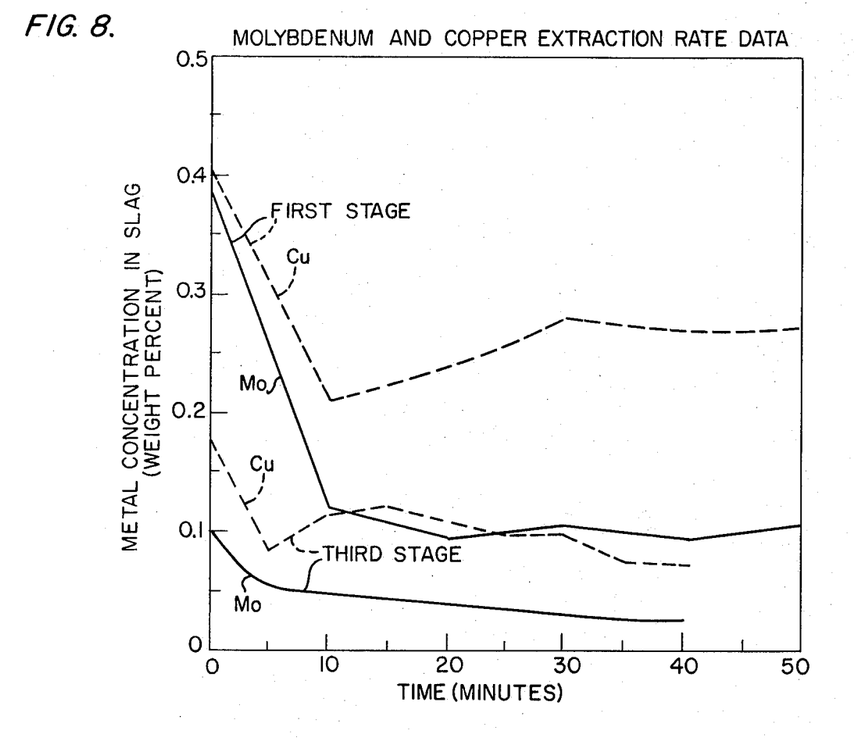
FIG. 8 is a graph showing molybdenum and copper extraction rate data for first and third stages of a simulated three-stage furnace reactor.

The data is presented in FIG. 8 and shows that rapid extraction rates can be achieved in both stages. Thus, slag initially containing 0.4 weight percent Mo and 0.4 weight percent Cu can be cleaned to 0.03 weight percent Mo and 0.1 weight percent Cu according to the proposed process.

EXAMPLE 5

Several mattes containing Mo, Cu, Fe and S were oxidized in a rotary kiln to remove sulfur and make an oxide calcine from which the molybdenum and copper could be leached. The weights and compositions of four selected mattes which were roasted are shown in Table 6. The weights and compositions of the calcine are given.

TABLE 6

Material Balances for Oxidizing Mo-Cu-Fe-S Mattes

IN MATTE

| Leach No. | Total Wt. (g) | Composition (Wt. %) | | | | Temp. (°C.) |
|---|---|---|---|---|---|---|
| | | Mo | Cu | Fe | S | |
| 1 | 741.5 | 1.90 | 14.1 | 54.2 | 20.5 | 800 |
| 2 | 405.0 | 6.72 | 6.07 | 54.2 | 13.0 | 800 |
| 3 | 820.0 | 6.98 | 7.6 | 53.3 | 12.9 | 700 |
| 4 | 744.1 | 1.95 | 14.1 | 54.9 | 20.8 | 700 |

ROAST OUT CALCINE

| Leach No. | Total Wt. (g) | Composition (Wt. %) | | | |
|---|---|---|---|---|---|
| | | Mo | Cu | Fe | S |
| 1 | 733.1 | 1.76 | 13.7 | 53.0 | 0.63 |
| 2 | 401.2 | 6.20 | 5.6 | 46.9 | 0.38 |
| 3 | 801.9 | 6.80 | 5.40 | 50.2 | 3.0 |
| 4 | 740.5 | 1.80 | 12.4 | 51.8 | 2.9 |

OUT SCRUBBER RES.

| Leach No. | Total Wt. (g) | Composition (Wt. %) | | | |
|---|---|---|---|---|---|
| | | Mo | Cu | Fe | S |
| 1 | 1.75 | 0.94 | 10.8 | 7.71 | 15.5 |
| 2 | 0.35 | 0.62 | 0.69 | 2.75 | 14.4 |
| 3 | 0.37 | 0.72 | 7.56 | 4.90 | 17.8 |
| 4 | 0.39 | 0.41 | 3.16 | 9.55 | 15.4 |

Essentially all of the molybdenum and copper were retained in the calcine. At 800°C, over 95 percent of the sulfur was removed from the matte whereas at 700°C, only 75 to 85 percent of the sulfur was removed. All of the roaster off gases passed through an aqueous scrubber to collect dusts and vaporized molybdenum (see Table 6). Negligible amounts of molybdenum and copper were lost due to dusts or vaporization.

The calcines of the roasted mattes were selectively leached in sulfuric acid and alkali. The results are presented in Table 7. Roasted at 800°C, 78 to 85 percent of Mo and 20 to 60 percent of Cu were leached in $H_2SO_4$. In contrast, 78 percent of Mo and only 0.1 – 0.2 percent of Cu were leached in NaOH. Roasting at 700°C resulted in lower extractions of Mo (45 and 59 percent in $H_2SO_4$ and 19 and 46 percent in NaOH) and higher leaching of iron in $H_2SO_4$.

TABLE 7

Extractions with Acid or Alkali Leaching of Mattes from Roasting Experiments

Acid Leach

| Leach No. | Mo % | Cu % | Fe % | Acid Consumption g acid/g calcine |
|---|---|---|---|---|
| 1 | 78.1 | 19.6 | 0.68 | — |
| 2 | 84.9 | 60.6 | 8.3 | — |
| 3 | 44.6 | 9.9 | 45.6 | 0.34 |
| 4 | 58.6 | 86.2 | 10.1 | 0.20 |

Alkali Leach

| Leach No. | Mo % | Cu % | Fe % | Acid Consumption g alkali/g calcine |
|---|---|---|---|---|
| 1 | 77.7 | 0.19 | 0 | — |
| 2 | 78.0 | 0.1 | 0 | — |
| 3 | 18.9 | 0.19 | 0 | 0.05 |
| 4 | 46.4 | 0.04 | 0 | 0.10 |

EXAMPLE 6

Preleaching matte with strong acid dissolves iron from the matte. Three mattes were pretreated with 5N $H_2SO_4$ as shown in Table 8. As indicated in Table 8, the content of iron was reduced from 54–55 percent to 31–32 percent in Experiments 7 and 8 and to 17 percent in Experiment 4. With the experimental accuracy, all of the molybdenum and copper are retained in the solid residue, which is enriched in molybdenum and copper because of the removal of iron and sulfur.

These preleached residues were oxidized in the rotary kiln and then leached in sulfuric acid and in sodium hydroxide.

The data for roasting is presented in Table 9. At 700°C, not all of the sulfur in the matte was oxidized whereas at 800°C, over 95 percent of the sulfur was oxidized.

TABLE 8

Mass Balances for Preleaching and Roasting

IN

| Exp. No. | Weight (g) | Mo | Composition Wt.% Cu | Fe | S | Vol. (l) | Conc. g/l |
|---|---|---|---|---|---|---|---|
| 4 | 1467.5 | 1.95 | 14.1 | 54.9 | 20.8 | 4500. | 245 (5N) |
| 7 | 1451.8 | 1.90 | 14.1 | 54.2 | 20.5 | 4500. | 245 (5N) |
| 8 | 1592.0 | 6.72 | 6.07 | 54.2 | 13.0 | 4500. | 245 (5N) |

PRELEACH OUT SOLIDS

| Exp. No. | Total Weight (g) | Mo | Composition Wt. Percent Cu | Fe | S |
|---|---|---|---|---|---|
| 4 | 491.0 | 5.31 | 40.2 | 17.2 | 16.1 |
| 7 | 604.4 | 4.14 | 31.5 | 31.0 | 15.2 |
| 8 | 937.0 | 11.1 | 10.2 | 31.7 | 7.78 |

OUT FILTRATE

| Exp. No. | Volume (l) | Acid g/l | Mo | Composition g/l Cu | Fe |
|---|---|---|---|---|---|
| 4 | 2.475 | 26.6 | .002 | .012 | 92.9 |
| 7 | 2.600 | 53.1 | .014 | .058 | 82.6 |
| 8 | 3.500 | .355 | .002 | .011 | 92.3 |

OUT WASH

| Exp. No. | Volume (l) | Mo | Cu | Fe |
|---|---|---|---|---|
| 4 | 6.650 | .017 | .012 | 71.0 |
| 7 | 5.225 | .003 | .019 | 72.3 |
| 8 | 3.650 | .004 | .008 | 58.5 |

TABLE 9

Material Balances for Oxidizing Preleached Mo-Cu-Fe-S Mattes

IN MATTE

| Exp. No. | Total Wt. (g) | Mo | Composition (Wt.%) Cu | Fe | S | Temp. (°C.) |
|---|---|---|---|---|---|---|
| 4 | 345.2 | 5.31 | 40.2 | 17.2 | 16.1 | 800 |
| 7 | 514.3 | 4.14 | 31.5 | 31.0 | 15.2 | 700 |
| 8 | 894.0 | 11.1 | 10.2 | 31.7 | 7.8 | 700 |

TABLE 9 – CONTINUED

Material Balances for Oxidizing Preleached Mo-Cu-Fe-S Mattes

IN MATTE

| Exp. No. | Total Wt. (g) | Mo | Composition (Wt.%) Cu | Fe | S | Temp. (°C.) |
|---|---|---|---|---|---|---|

ROAST

OUT CALCINE

| Exp. No. | Total Wt. (g) | Mo | Composition (Wt.%) Cu | Fe | S |
|---|---|---|---|---|---|
| 4 | 338.9 | 4.90 | 37.6 | 16.6 | 4.5 |
| 7 | 498.6 | 4.00 | 32.4 | 33.3 | 0.4 |
| 8 | 853.8 | 11.4 | 10.2 | 31.4 | 0.56 |

OUT SCRUBBER RES.

| Exp. No. | Total Wt. (g) | Mo | Composition (Wt.%) Cu | Fe | S |
|---|---|---|---|---|---|
| 4 | 3.10 | 2.71 | 16.3 | 8.69 | 17.1 |
| 7 | 3.59 | 2.08 | 17.0 | 11.4 | 17.7 |
| 8 | 1.26 | 8.77 | 9.35 | 8.80 | 16.8 |

The acid and caustic leaching data is presented in Table 10. Generally, the molybdenum extractions in acid and base where higher for the preleached material than for the unleached material.

TABLE 10

Extractions with Acid or Alkali Leaching of Oxidized, Preleached Mattes

Acid Leach

| Leach No. | Mo % | Cu % | Fe % | Acid Consumption g acid/ g calcine |
|---|---|---|---|---|
| 4 | 83.6 | 61.9 | 6.2 | 0.30 |
| 7 | 78.6 | 54.3 | 3.5 | 0.29 |
| 8 | 94.1 | 80.4 | 4.7 | 0.19 |

Alkali Leach

| Leach No. | Mo % | Cu % | Fe % | Alkali Consumption g alkali/ g calcine |
|---|---|---|---|---|
| 4 | 39.7 | 0 | 0 | 0.10 |
| 7 | 83.6 | 0.05 | 0 | 0.05 |
| 8 | 75.7 | 0.07 | 0 | 0.10 |

Figure 9:
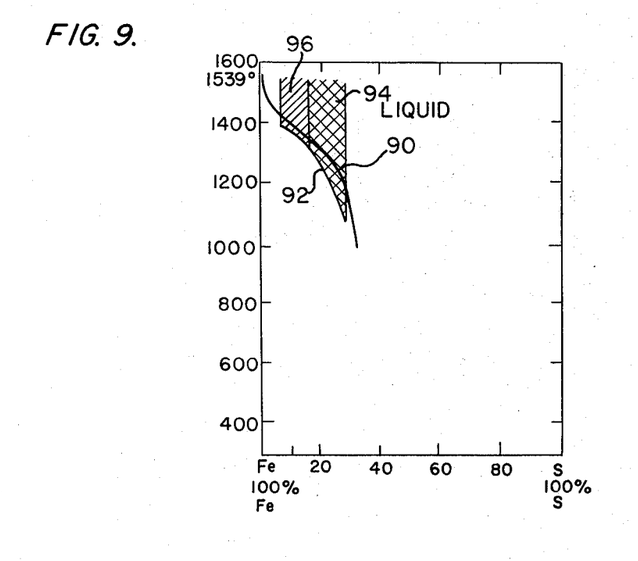
FIG. 9 is a phase diagram for an Fe—S system.

As has been stated above, an important feature of the present invention is that the invention involves mixing the slag with a matte of a specific composition at a specific temperature range to extract metal values in the slag into the matte. The composition of the matte can vary according to the temperature of the system and vice versa. In this regard, a complete range of matte compositions and temperatures for use during the extraction step is shown in FIG. 9 is a phase diagram of Fe-S systems and was taken from "Phase Diagrams for Ceramists," Levin, Robbins and McMurdie, published by the American Chemical Society, 1969, the teachings of which are incorporated herein by reference. It should be noted that FIG. 9 is only a portion of the curve appearing as FIG. 3948 in the foregoing publication. Of course, only the portion of the curve of FIG. 3948 that is relevant to the present invention appears in FIG. 9. In connection with FIG. 9, curve 90 is a curve which shows the melting point of Fe—S systems for various Fe and S concentrations. Curve 92 is a curve which shows the lower temperature limits for contacting slags with various matte compositions in accordance with the present invention. In connection with curve 92, only temperatures above curve 92 can be utilized during the extraction step in accordance with the present invention for the matte compositions shown at the corresponding composition co-ordinate. It should be noted, however, that the most economical operation of the process results when a temperature is maintained at a point on, or just above curve 92. In connection with ranges of temperatures and matte compositions in accordance with the present invention, the cross-hatched area indicated by reference numeral 94 indicates the preferred range of temperatures and matte compositions whereas cross-hatched area 96 indicates an operable range of temperatures and matte compositions.

As noted above, the present process is preferably used in treating reverberatory furnace slag. The foregoing is true because when smelting copper concentrates by conventional methods, a major part of the contained molybdenum is collected in the reverberatory furnace slag which is normally discarded as the waste product. It is for these slags that the invention was developed, but is applicable to any slag containing a significant amount of non-ferrous metal values. For example, copper converter slag can be treated by the process of the present invention; however, because of the high concentration of copper in converter slags, it is preferable to first remove a percentage of copper by the process disclosed in a co-pending patent application entitled, "Pyrometallurgical Recovery of Copper Values from Converter Slags," by P. R. Ammann and J. H. Kim, filed on Mar. 5, 1973, as U.S. Pat. application Ser. No. 338,333, the teachings of which are incorporated herein by reference. In short, it is more economical to remove the copper in converter slags by the reduction process disclosed in the foregoing patent application and then treat the remaining slag by the process of the present invention to remove further values and molybdenum values.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for recovering molybdenum values from molybdenum-bearing, ferruginous slags comprising
    treating the slag in an extraction step by mixing the slag with a molten immiscible metal sulfide matte where the matte contains iron and sulfur in an iron to sulfur mole ratio range of nine to one to two to one at a temperature ranging between the slag melting point and 1600°C. to produce a slag treatment product;
    separating the slag treatment product from the slag;
    roasting the slag treatment product to produce a calcine;
    leaching the calcine to dissolve the molybdenum values into a leach solution; and
    recovering molybdenum from the leach solution.

2. The process as set forth in claim 1 wherein the slag treatment product is solidified prior to roasting.

3. The process as set forth in claim 2 wherein the slag treatment product is solidified by spraying the slag treatment product with water to place the slag treatment product in a finely-divided solid state.

4. The process as set forth in claim 1 wherein the molybdenum values in the slag are recovered as molybdenum oxide.

5. The process as set forth in claim 1 wherein the molybdenum values in the slag are recovered as ammonium paramolybdate.

6. The process as set forth in claim 1 wherein the calcine is leached in a basic solution.

7. The process as set forth in claim 1 wherein the calcine is leached in an acidic solution.

8. The process as set forth in claim 1 wherein the composition of the matte is maintained to contain iron and sulfur in a mole ratio of from about three to one to two to one and wherein the temperature of the system during the extraction step is maintained between 1200°C to 1375°C.

9. In a process for the recovery of molybdenum from a molybdenum-bearing slag which includes the steps of extracting molybdenum values into a molten immiscible metal sulfide matte, oxidizing the matte, leaching the matte and recovering the molybdenum from the leach solution where the improvement comprises controlling the composition of the matte and the temperature of the system during the extraction step so that the metal sulfide matte contains iron and sulfur in a mole ratio of two to one to nine to one with the temperature of the system during the extraction step ranging between the slag melting point and 1600°C.

10. The process as set forth in claim 9 wherein the slag and matte are mixed in a multistage furnace reactor with each stage being connected in series so that the matte in one stage can flow into another stage and wherein the slag can flow from one stage to another counter to the flow of the matte.

11. The process as set forth in claim 10 wherein the temperature during the extraction step is maintained between the range of 1200°C to 1375° and the composition of the matte is controlled to contain iron and sulfur in a mole ratio of from about 2 to 1 to 3 to 1.

12. The process as set forth in claim 11 wherein the matte is oxidized at a temperature of about 800°C.

13. The process as set forth in claim 12 wherein in the leaching step, the calcine is leached in an acid.

14. The process as set forth in claim 9 wherein the composition of the matte and temperature of the system during the extraction step are maintained to be within the cross-hatched areea of FIG. 9 of the drawing.

15. The process as set forth in claim 14 wherein the composition of the matte and temperature of the system during the extraction step are maintained to be within the cross-hatched area represented by reference numeral 94 of the drawing.

16. The process as set forth in claim 1 wherein during the roasting step, the slag treatment product is roasted at a temperature of 800°C to remove sulfur and produce an oxide calcine.

* * * * *